(12) United States Patent
Mendoza et al.

(10) Patent No.: US 8,016,346 B2
(45) Date of Patent: Sep. 13, 2011

(54) VEHICLE BODY

(75) Inventors: Boris Suaznabar Mendoza, Beitigheim (DE); Ursula Schäf, Markgroeningen (DE); Heiko Teichmann, Weil Im Schönbuch (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 285 days.

(21) Appl. No.: 12/473,767

(22) Filed: May 28, 2009

(65) Prior Publication Data

US 2009/0278385 A1 Nov. 12, 2009

(30) Foreign Application Priority Data

Aug. 4, 2008 (DE) .......................... 10 2008 036 337

(51) Int. Cl.
*B62D 25/20* (2006.01)

(52) U.S. Cl. ............... 296/193.07; 296/204; 296/187.12

(58) Field of Classification Search .................. 296/204, 296/187.12, 203.01, 203.03, 65.01, 193.07
See application file for complete search history.

(56) References Cited

U.S. PATENT DOCUMENTS

| | | | |
|---|---|---|---|
| 6,491,337 B2 | 12/2002 | Averdiek et al. | |
| 2008/0007089 A1 | 1/2008 | Bachmann | |

FOREIGN PATENT DOCUMENTS

| | | |
|---|---|---|
| DE | 102 32 843 A1 | 2/2004 |
| DE | 100 05 245 B4 | 4/2004 |
| DE | 102 60 393 B4 | 7/2004 |
| DE | 10260393 B4 | 7/2004 |
| DE | 10 2006 009 100 A1 | 8/2007 |
| DE | 10 2006 031 452 A1 | 1/2008 |
| EP | 1382515 B1 | 9/2006 |
| KR | 10 2005 011 0134 A | 11/2005 |

OTHER PUBLICATIONS

German Patent and Trademark Office Search Report, dated Apr. 21, 2009.

*Primary Examiner* — Dennis H Pedder

(57) ABSTRACT

A vehicle body of a motor vehicle has a central tunnel which is connected on its open lower side to at least one transverse bridge support. The bridge support is mounted to the lower side of bent limb portions of the central tunnel and is connected via at least two bolted connections, which are offset in the longitudinal and transverse directions of the vehicle, to a supporting bracket arranged on the upper side of the bent limb portions. The bridge support together with the supporting bracket faces an end side of the seat crossmember in an exposed manner. Furthermore, two bridge supports which are connected to each other via longitudinal struts can be provided on the central tunnel.

7 Claims, 3 Drawing Sheets

VEHICLE BODY

CROSS-REFERENCE TO RELATED APPLICATION

This application claims the priority, under 35 U.S.C. §119, of German application DE 10 2008 036 337.5, filed Aug. 4, 2008; the prior application is herewith incorporated by reference in its entirety.

BACKGROUND OF THE INVENTION

Field of the Invention

The invention lies in the automotive field. More specifically, the invention relates to a vehicle body with seat crossmembers for a vehicle front seat. The seat cross-members are arranged on the vehicle floor of a motor vehicle on both sides of a central tunnel which is U-shaped in cross section.

German published patent application DE 102 32 843 A1 describes seat cross-members for a vehicle, the seat cross-members extending in the floor region on both sides of a central tunnel of the vehicle body. A passage opening extends through one of the seat crossmembers as an air-guiding duct.

SUMMARY OF THE INVENTION

It is accordingly an object of the invention to provide a vehicle body construction, which overcomes the disadvantages of the heretofore-known devices and methods of this general type and which provides for a vehicle body with seat crossmembers that are arranged on the vehicle floor of a motor vehicle on both sides of a central tunnel and are arranged and held with respect to the central tunnel in such a manner that an optimum crash behavior in the event of a side impact is ensured.

With the foregoing and other objects in view there is provided, in accordance with the invention, a vehicle body, comprising:

a vehicle floor formed with a central tunnel having a U-shaped cross section, the central tunnel having bent limb portions and a downwardly open, lower side;

seat crossmembers for a front seat of a motor vehicle disposed on the vehicle floor laterally on both sides of the central tunnel, the seat crossmembers having an end face facing towards the central tunnel;

at least one transversely arranged bridge support disposed at the lower side of the central tunnel and connected to a lower side of the bent limb portions of the central tunnel;

a supporting bracket disposed on an upper side of the bent limb portions of the central tunnel;

at least two bolted connections disposed with an offset in a longitudinal direction and a transverse direction of the vehicle connecting the bridge support to the supporting bracket on the upper side of the bent limb portions; and the bridge support together with the supporting bracket facing the end face of the seat crossmember with a spacing distance.

The advantages primarily obtained with the invention are that, in a basic position, the seat crossmember is arranged at a distance from the central tunnel or from the bridge support such that an air gap is thereby obtained and therefore an optimum crash behavior in the event of a side impact can be obtained. According to the invention, the optimum crash behavior is essentially obtained in that the central tunnel is connected on its open lower side to at least one transversely arranged bridge support which is arranged on the lower side of bent limb portions of the central tunnel and is connected via at least two bolted connections, which are offset in the longitudinal and transverse directions of the vehicle, to a supporting bracket arranged on the upper side of the bent limb portions, and the bridge support together with the supporting bracket faces an end side of the seat crossmember in an exposed manner or at a distance.

In particular, it is furthermore provided, according to a refinement of the invention, that an end side of the bridge support, which side is directed toward the seat crossmember, and an upright limb of the supporting bracket (i.e., the limb is angled such that it is upright), lie in a common vertical plane which, in a basic position, faces a further vertical plane of the seat crossmember, which plane runs through the end side of the seat crossmember, at a distance and, in a crash position, the two planes are adjacent to each other. By means of this arrangement and design of the seat crossmember, the bridge support and the supporting bracket and of connecting elements to the central tunnel, such a spacing is possible with optimum strength at the same time. The offset bolted connections of the bridge support to the central tunnel result in an optimized transmission of torque in the event of a crash.

According to the invention, it is furthermore provided that a connecting element to the central tunnel comprises a support plate which is arranged between the central tunnel and the seat crossmember and is connected by a downwardly bent limb to an upper side of the seat crossmember, and the bent limb is designed such that it can be deformed in the event of a crash. A further connecting element comprises what is referred to as a Z-shaped floor edge profile which is formed by the bent limb portions of the central tunnel and can be connected to the floor panel, and an upright web between limbs of the Z-profile is designed such that it can be deformed in the event of a crash.

In the basic position, a limb of the supporting bracket, which limb is angled such that it is upright, is at a distance from the downwardly bent limb of the support plate and, in the crash position, is adjacent thereto. In the basic position, the end side of the bridge support faces the upright web of the Z-shaped floor edge profile of the bent limb portions at a distance and, in the crash position, is adjacent thereto. By means of this arrangement of the connecting elements to the central tunnel and/or to the seat crossmember and to the bridge support, a stable strength bond is advantageously provided between the seat crossmembers and the central tunnel, on the one hand, and the bridge support together with the central tunnel and the floor panel, on the other hand.

With the above and other objects in view there is also provide, in accordance with the invention, a vehicle body, similar to the one outlined above, and further: the at least one bridge support is one of at least two bridge supports disposed at the lower side of the central tunnel, longitudinally spaced from one another and connected to the lower side of the bent limb portions of the central tunnel. Further, there are provided longitudinal struts extending between the bridge supports; and an air-guiding sleeve disposed in the seat crossmember and held by an inner web plate of the seat crossmember and passing through the seat crossmember.

In this further refinement of the invention, it is provided that an air-guiding sleeve is arranged in a web plate in the seat crossmember. The air-guiding sleeve is intended to additionally reinforce the seat crossmember in the transverse direction of the vehicle. Furthermore, it is provided, according to this refinement, that a second bridge support is arranged on the end side of the central tunnel, and the two bridge supports are connected to each other via the longitudinal struts.

Other features which are considered as characteristic for the invention are set forth in the appended claims.

Although the invention is illustrated and described herein as embodied in vehicle body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
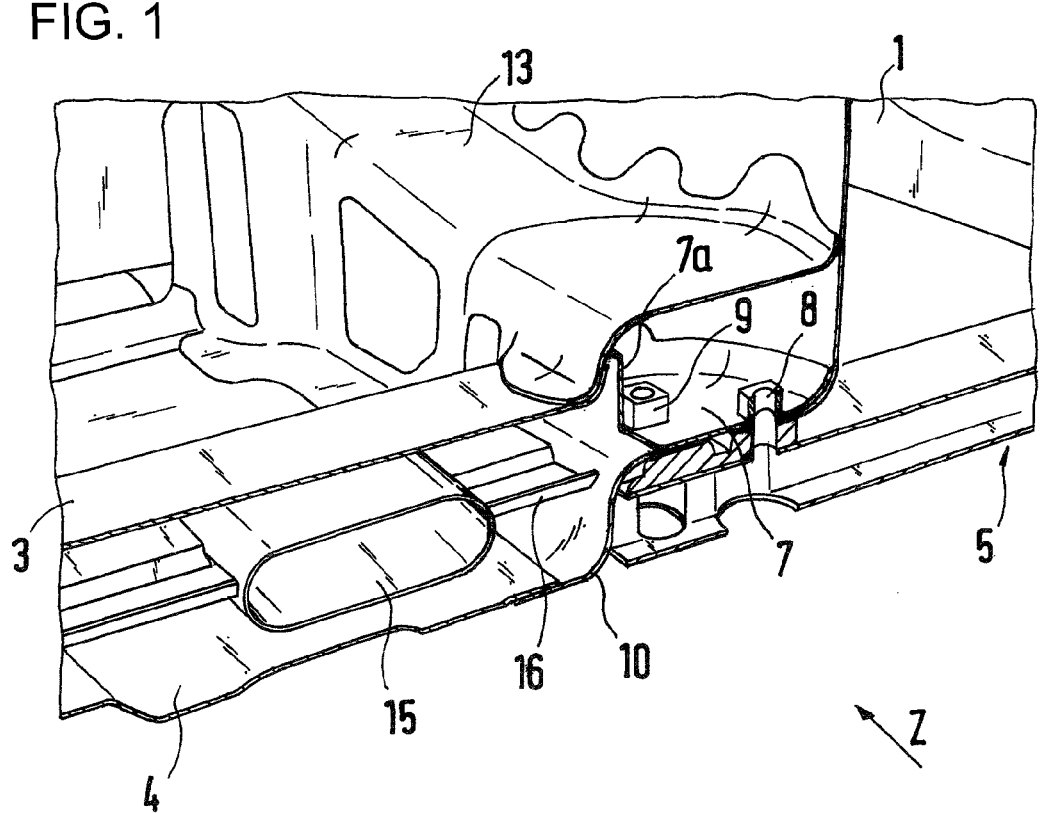
FIG. 1 is a partially sectional, perspective view of a seat crossmember, as seen from the rear, together with the central tunnel and bridge support and connecting elements.
Figure 4:
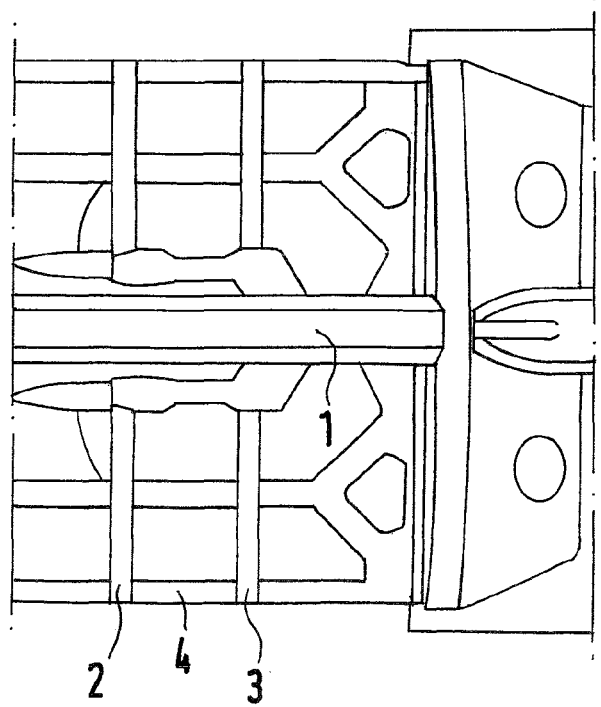
FIG. 4 is a top view of the vehicle floor together with the seat crossmember on both sides of the central tunnel.
Figure 2:
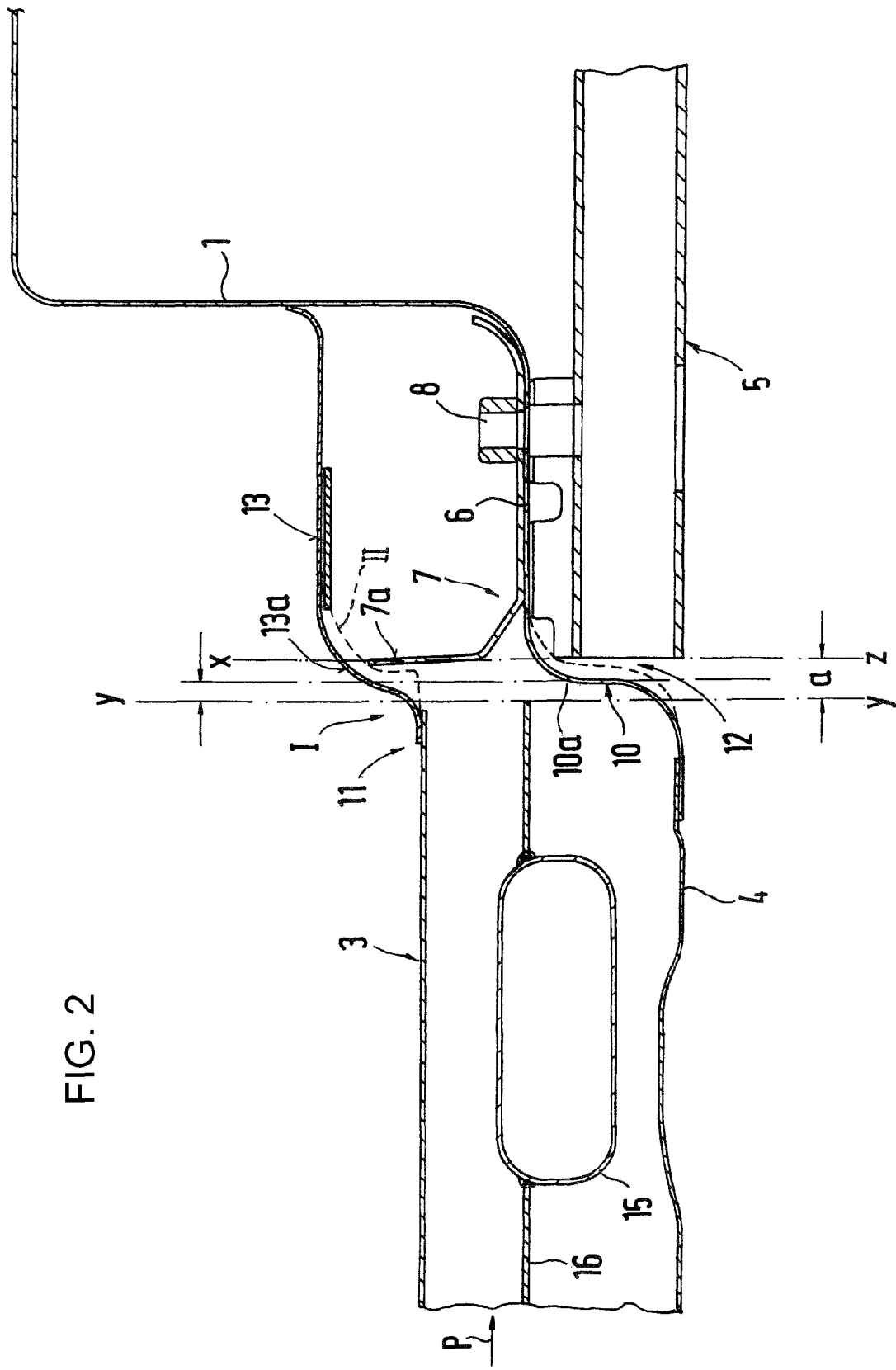
FIG. 2 is a sectional end view of the structure of FIG. 1, as viewed in the direction of the arrow Z.
Figure 3:
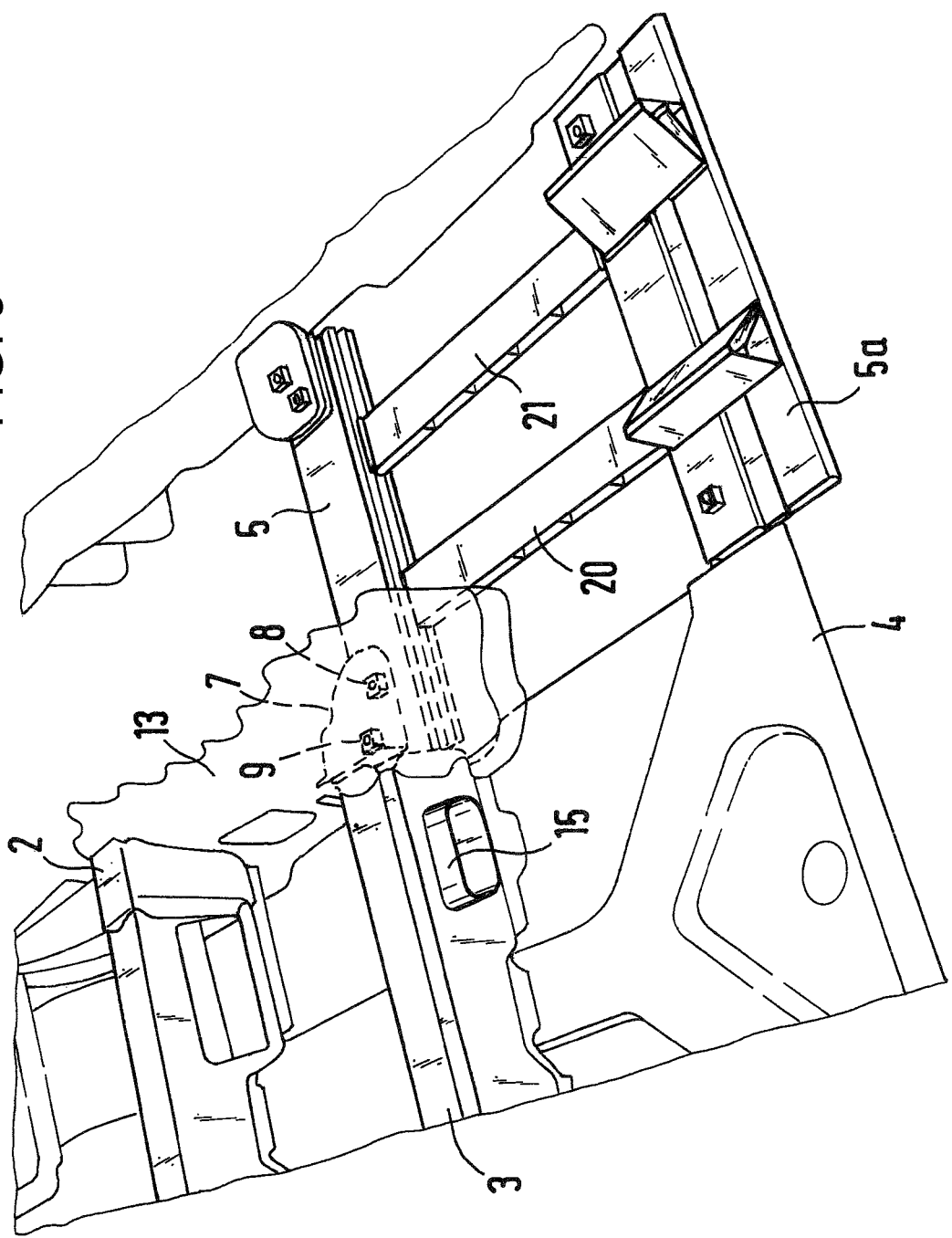
FIG. 3 is a partly broken-away, perspective view, from above, of the seat cross-member together with the bridge support.

Referring now to the figures of the drawing in detail and first, particularly, to FIGS. 1 and 2 thereof, the vehicle body of a motor vehicle comprises a downwardly open central tunnel 1 in the floor panel, the central tunnel being U-shaped in cross section and having two seat crossmembers 2 and 3 in each case on both sides. The seat crossmembers are connected to a vehicle floor 4 and accommodate a front seat. On the lower side of the central tunnel 1, a bridge support 5, which is arranged transversely with respect to the vehicle, is connected to bent limb portions 6 of the central tunnel 1 and to a supporting bracket 7. The supporting bracket 7 is held on the inner side of the bent limb portions 6 and the bridge support 5 is mounted to the outer side of the bent limb portions 6. The bent limb portions 6 are designed in each case as a Z-profile 10 on the end sides and are connected to the vehicle floor 4. The bridge support 5 is fastened to the bent limb portion 6 of the central tunnel 1 via a bolted connection 8, 9 which is offset in the transverse and longitudinal directions of the vehicle.

The seat crossmember 3 is fastened to the vehicle floor 4 and is connected to the central tunnel 1 via a support plate 13 and extends with its end face 11 (end side 11), which is directed toward the bridge support 5 and the supporting bracket 7, at the free end at a distance a from the end side 12 of the bridge support 5 and, in a basic position I, is arranged in an exposed manner with respect to the latter.

The supporting bracket 7 has an upright limb 7a which is arranged in a vertical plane x-x with the end side 12 of the bridge support 5. The plane x-x lies opposite the plane y-y, placed through the end side 11 of the seat crossmember 3, at the distance a.

In a crash position II, the seat crossmember 3 is displaced toward the central tunnel 1 by means of a transverse force in the arrow direction P such that the support plate 13 and the Z-profile 10 of the bent limb portion 6 of the central tunnel 1 are deformed, as illustrated by dashed lines, and the planes x-x and y-y are adjacent to each other, with the support plate 13 together with the seat crossmember 3 being placed against the upright limb 7a of the supporting bracket 7, and the Z-profile 10 of the bent limb portion 6 of the central tunnel 1 being placed with its upright limb 10a and with the seat crossmember 3 against the end side 12 of the bridge support 5.

The seat crossmember 3 can be provided with an air-guiding sleeve 15 which is held in a web plate 16. The air-guiding sleeve 15 reinforces the seat crossmember 3 in the event of a side impact. A bridge support 5 is arranged between seat crossmembers 3 arranged on both sides of the central tunnel 1, and a further bridge support 5a can be provided at the rear end of the central tunnel 1, and the two bridge supports 5 and 5a are connected to each other via longitudinal struts 20, 21.

The invention claimed is:

1. A vehicle body, comprising:
a vehicle floor formed with a central tunnel having a U-shaped cross section, said central tunnel having bent limb portions and a downwardly open, lower side;
seat crossmembers for a front seat of a motor vehicle disposed on said vehicle floor laterally on both sides of said central tunnel, said seat crossmembers having an end face facing towards said central tunnel;
at least one transversely arranged bridge support disposed at said lower side of said central tunnel and connected to a lower side of said bent limb portions of said central tunnel;
a supporting bracket disposed on an upper side of said bent limb portions of said central tunnel;
at least two bolted connections disposed with an offset in a longitudinal direction and a transverse direction of the vehicle connecting said bridge support to said supporting bracket on the upper side of said bent limb portions; and
said bridge support together with said supporting bracket facing said end face of said seat crossmember with a spacing distance.

2. The vehicle body according to claim 1, wherein said supporting bracket is formed with an upwardly angled, upright limb and said bridge support is formed with an end face directed towards said seat crossmember, and wherein said end face of said bridge support and said upright limb of said supporting bracket lie in a common vertical plane which, in a basic position, faces a further vertical plane defined by said end face of said seat crossmember at a given spacing distance and said vertical planes come to lie adjacent to each other in a crash position.

3. The vehicle body according to claim 1, which comprises a cross-sectionally angled support plate disposed between said central tunnel and said seat crossmember, said support plate being connected by a downwardly bent limb to an upper side of said seat crossmember, and said downwardly bent limb being configured to be deformed in an event of a crash.

4. The vehicle body according to claim 1, wherein said bent limb portions of said central tunnel are formed in a Z-shaped floor edge profile connected to a floor panel, and an upright web between limbs of said Z-profile is configured to be deformed in an event of a crash.

5. The vehicle body according to claim 3, wherein, in the basic position, said upright limb of said supporting bracket is disposed at a distance from said downwardly bent limb of said support plate and, in the crash position, said upright limb is disposed adjacent said downwardly bent limb.

6. The vehicle body according to claim 2, wherein said bent limb portions of said central tunnel are formed in a Z-shaped floor edge profile with an upright web and limbs, and wherein, in the basic position, said end face of said bridge support faces said upright web at a distance and, in the crash position, said end face of said bridge support is adjacent thereto.

7. A vehicle body, comprising:

a vehicle floor formed with a central tunnel having a U-shaped cross section, said central tunnel having bent limb portions and a downwardly open, lower side;

seat crossmembers for a front seat of a motor vehicle disposed on said vehicle floor laterally on both sides of said central tunnel, said seat crossmembers having an end face facing towards said central tunnel;

two transverse bridge supports disposed at said lower side of said central tunnel, longitudinally spaced from one another and connected to a lower side of said bent limb portions of said central tunnel;

a supporting bracket disposed on an upper side of said bent limb portions of said central tunnel;

at least two bolted connections disposed with an offset in a longitudinal direction and a transverse direction of the vehicle connecting said bridge support to said supporting bracket on the upper side of said bent limb portions;

said bridge support together with said supporting bracket facing said end face of said seat crossmember with a spacing distance;

longitudinal struts extending between said bridge supports; and an air-guiding sleeve disposed in said seat crossmember and held by an inner web plate of said seat crossmember and passing through said seat crossmember.

\* \* \* \* \*